G. M. GOUDY.
CUSHION TIRE.
APPLICATION FILED FEB. 13, 1920.
1,348,105.
Patented July 27, 1920.
2 SHEETS—SHEET 1.
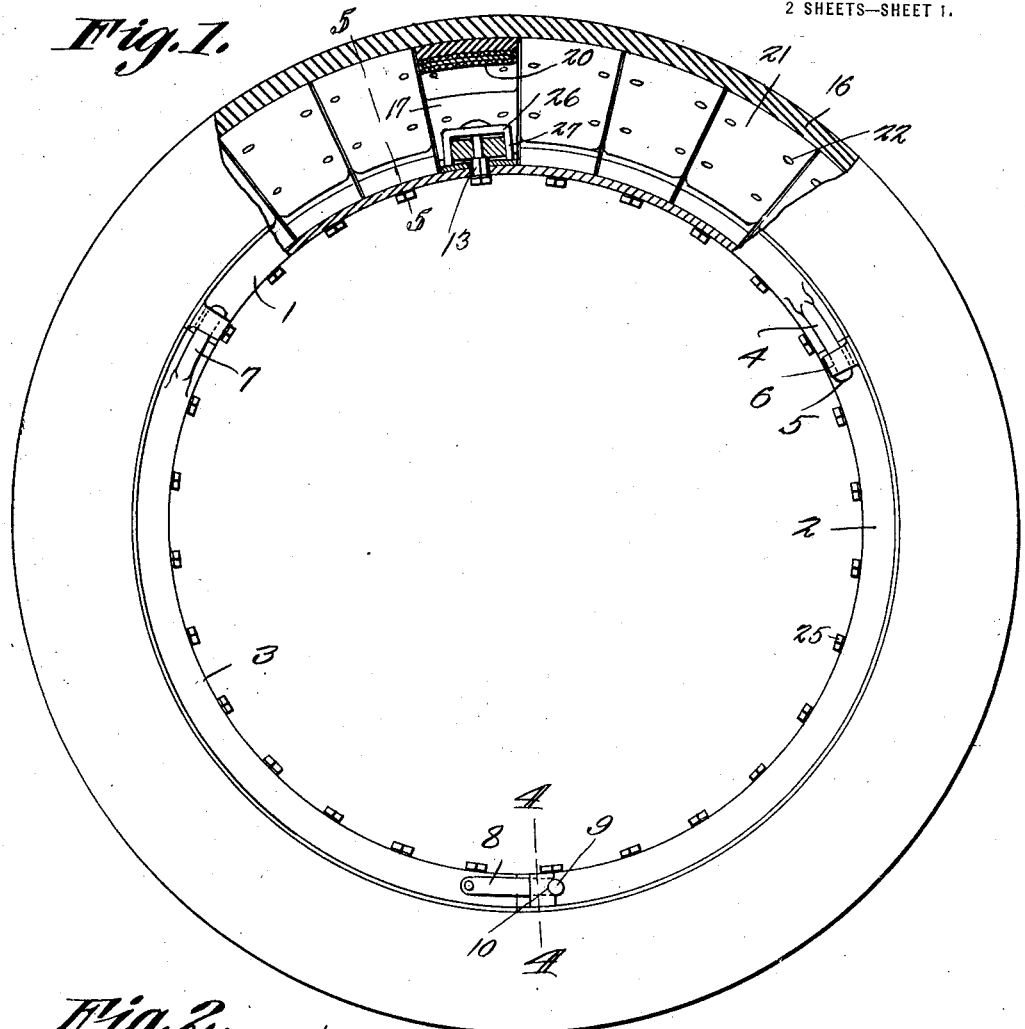
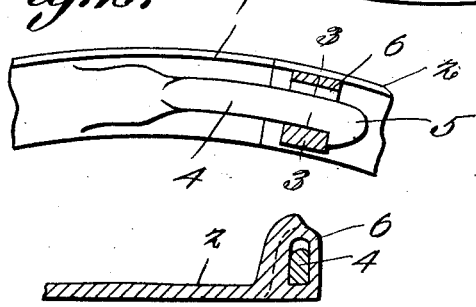
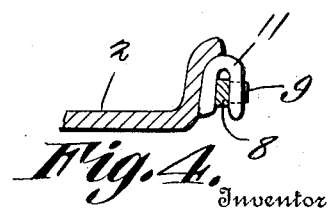
Witness
Inventor,
G. M. Goudy
By C. A. Snow & Co.
Attorneys.

G. M. GOUDY.
CUSHION TIRE.
APPLICATION FILED FEB. 13, 1920.
1,348,105.
Patented July 27, 1920.
2 SHEETS—SHEET 2.
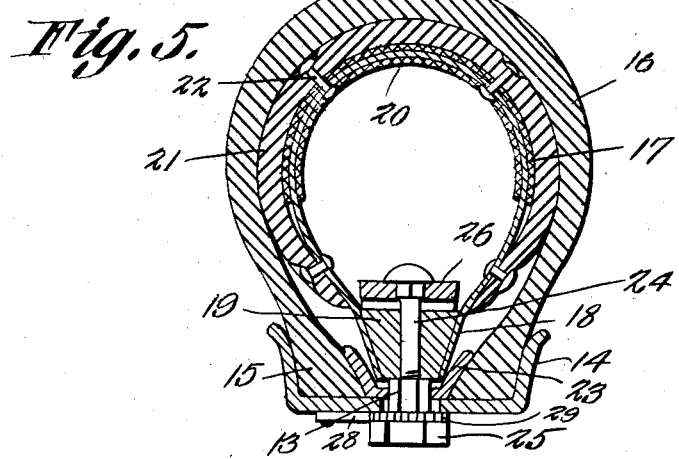
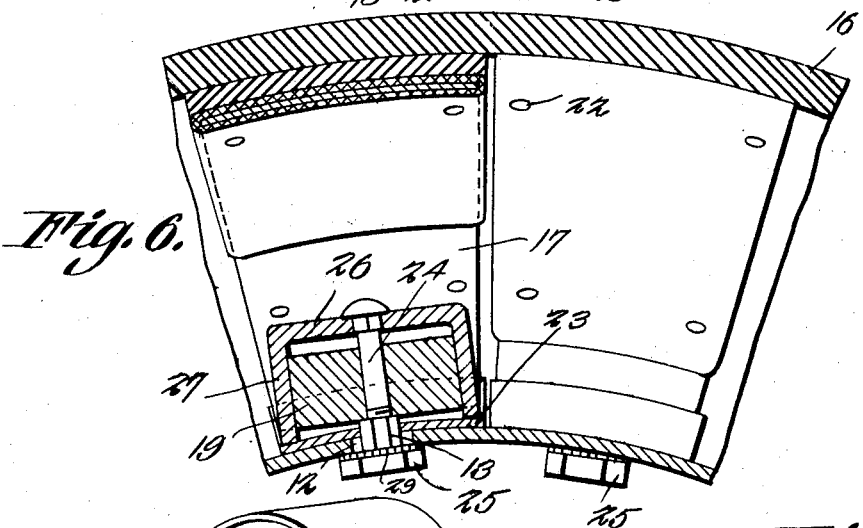
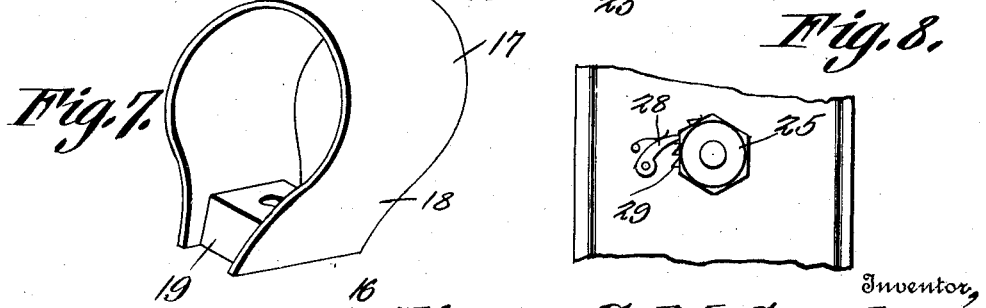
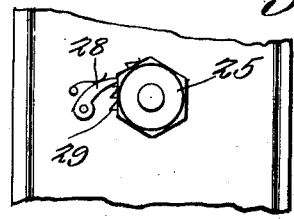
Inventor,
G. M. Goudy
By C. A. Snow & Co.
Attorneys.
Witness

UNITED STATES PATENT OFFICE.

GEORGE MADISON GOUDY, OF GOSHEN, INDIANA.

CUSHION-TIRE.

1,348,105.  Specification of Letters Patent.  Patented July 27, 1920.

Application filed February 13, 1920. Serial No. 358,468.

*To all whom it may concern:*

Be it known that I, GEORGE M. GOUDY, a citizen of the United States, residing at Goshen, in the county of Elkhart and State of Indiana, have invented a new and useful Cushion-Tire, of which the following is a specification.

This invention relates to cushion tires employed in connection with motor vehicles, and it is the primary object of the invention to provide a novel cushion tire possessing resilient qualities equal to the pneumatic tires now in use.

A further object of the invention is to provide a tire of this character which will not be rendered inoperative due to puncture, thus reducing the cost of upkeep, to a minimum, and lessening the period of which a motor vehicle is out of use undergoing repair.

A further object of the invention is to provide a tire wherein the cushioning elements of the tire may be adjusted within the casing to regulate the tensioning of the cushioning elements according to the weight of the load supported on the tire.

A still further object of the invention is to provide a tire structure wherein the casing is supported in spaced relation with the flanges of the supporting rim, thus insuring against rim cutting.

With the foregoing and other objects in view which will appear as the description proceeds, the invention resides in the combination and arrangement of parts and in the details of construction hereinafter described and claimed, it being understood that changes in the precise embodiment of the invention may be made within the scope of what is claimed, without departing from the spirit of the invention.

Referring to the drawings:—

Figure 1 illustrates a side elevational view of a rim provided with a tire constructed in accordance with the present invention, the tire and rim being shown as partly broken away.

Fig. 2 illustrates a fragmental detail view of abutting rim sections, the same being shown partly in section.

Fig. 3 illustrates a sectional view taken on line 3—3 of Fig. 2.

Fig. 4 illustrates a sectional view taken on line 4—4 of Fig. 1.

Fig. 5 illustrates a sectional view taken on line 5—5 of Fig. 1.

Fig. 6 illustrates a fragmental view of a tire the same being partly broken away.

Fig. 7 illustrates a detail view of the cushioning spring.

Fig. 8 illustrates a fragmental view of a rim disclosing the guard nut employed in connection with the tire, and Fig. 9 illustrates a fragmental detail view disclosing the manner of securing the tire to a clencher rim.

Referring to the drawings in detail, the invention is shown as including a rim comprising a plurality of sections indicated by the reference characters 1, 2 and 3 respectively, the section 1 being provided at one of its ends with arms 4 extending in parallel relation with the section, the free end of each of said arms having an enlargement 5 forming a shoulder adapted to position itself behind one of the side edges of the tubular keepers 6 carried by the adjacent rim section 2, and located in positions within the path of travel of the enlargements 5, when the rim sections are brought together.

The opposite end of this rim section 1, on opposite sides thereof is provided with keepers similar to that indicated at 6, which keepers accommodate portions of the arms 7 of the section 3, for securing the sections 1 and 3 together. The section 3 is also provided on opposite sides thereof and at its opposite end with pivoted latch members 8, which latch members are of lengths to extend to positions overlapping the point of contact between the sections 2 and 3, the latch members being also provided with heads 9 adapted to fit within the recessed portion 10 formed in the substantially U-shaped keepers 11 to insure against displacement of the latch members.

From the foregoing it is obvious that on assembling the tire, the rim sections are first positioned so that the arms 4 and 7 thereof will be embraced by the keepers of the adjacent sections, the latch members 8, are then forced to positions within the keepers 11, thus securing the sections of the rim in proper relation with each other.

Each of the rim sections is provided with a plurality of openings 12, which openings are disposed in proper spaced relation with each other, and are of diameters large enough to receive the tensioning nuts 13 adapted to operate within the respective openings for purposes to be hereinafter more fully described.

The rim sections are of the usual construction, being provided with the radial flanges 14 to accommodate the beads 15 of the usual tire casing 16, and which is employed in connection with the tire structure of the present invention. The tire proper is made up of a plurality of independent sections disposed within the casing 16 in spaced relation with each other, and each of these sections includes a relatively wide metallic spring member 17, formed of suitable resilient, or spring metal bent to conform to the inner contour of the tire casing in which the same is to be supported, and has opposed leg sections 18 adapted to embrace a supporting block 19 which is secured to the leg sections 18 by welding, or in any suitable manner to securely unite the supporting block 19 and metallic spring member 17, so that movement of the supporting block 19 will result in a relative movement of the spring member 17.

Secured to the metallic spring member 17 is a covering 20 formed of canvas or other suitable protecting fabric which fabric is provided to reduce wear between the metallic spring member 17, and the rubber cushioning member 21 which is carried by the metallic spring member 17 and secured thereto by means of the rivets 22 disposed in proper relation within the cushioning member 21.

In order that the beads 15 of the tire casing 16 will be secured to the rim sections, against displacement due to lateral strain, the securing member 23 is provided, which securing member is of a length equal to the length of the tire sections, and coöperate with the flanges 14 for clamping the beads 15 of the casing 16 to the rim.

The supporting block 19, together with the opposed leg sections 18, are positioned within the securing member 23 and held in such position by means of the bolt 24, which bolt passes through a centrally disposed opening formed in the securing block 19, which opening is in registry with one opening of the rim proper so that the bolt 24 may extend beyond the inner side walls of the rim sections to receive the tensioning nut 13 and the guard nut 25.

Operating over the supporting block 19, is the yoke 26 which includes right angled arms 27 adapted to embrace the ends of the securing block 19, the extreme ends of said arms 27 contacting with the securing member 23, and since these arms 27 are of lengths greater than the thickness of the securing block 19, it will be seen that by tightening the tensioning nut 13 the ends of the arms 27 are forced into engagement with the securing member 23, with the result that the supporting blocks 19 are moved away from the rim sections.

It follows that the metallic spring section 17 is now forced outwardly to expand the casing 16 and increase the tension on the casing.

Coöperating with the guard nut 25, is a pawl 28 pivotally connected to the rim section, and as shown this pawl 28 is of a length to contact with the teeth 29 formed on the nut 25 so that rotary movement of the nut 25 in an anti-clockwise direction, is prevented.

If it is desired to increase the tension of the metallic spring members within the casing, it is only necessary to rotate the tensioning nuts to cause the block 19 associated therewith to be moved away from its rim sections, as before stated, and in the event that it becomes necessary to decrease the tension of the metallic spring members 17 to enhance the riding qualities of the tire, when used on light vehicles, the nuts are rotated in an opposite direction with the result that the tension of the metallic spring members 17 are decreased.

While I have shown and described one of the sections of the tire in detail, it is of course understood that this structure is duplicated in each section of the tire, and that these sections are arranged within the tire casing 16 in close relation with each other, as indicated by Fig. 6 of the drawings.

It is of course obvious that this invention, while shown as applied to a sectional rim, may be employed in connection with the usual clencher rim disclosed by Fig. 9 of the drawings, and indicated by the reference character 30, the securing member 23 being employed in its usual manner.

Having thus described the invention, what I claim as new is:—

1. In combination with a wheel rim having openings formed therein, a cushion tire including a casing, a plurality of independent sections positioned within the casing, each of said sections including a relatively wide metallic spring member, a supporting block having connection with the metallic spring member, a yoke positioned over the supporting block, said yoke having arms contacting with the rim, means extending through the rim and supporting block and contacting with the yoke for forcing the block away from the rim.

2. In combination with a wheel rim having openings formed therein, a cushion tire including a casing, spring members positioned within the casing, the spring members being positioned over the openings formed in the rim, a supporting block forming the base of each of the spring members and having an opening formed therein, said opening adapted to register with a predetermined opening of the rim, means positioned within each of the spring members and having means for exerting pressure on the rim for restricting movement of the supporting block associated therewith, a bolt passing through the registering openings in the rim and block said bolt having connection with said means, and a nut operating on one end of the bolt for moving the block away from the rim.

3. In combination with a wheel rim having openings formed therein, a cushion tire including a casing, spring means within the casing and supported by the rim for supporting the tread portion of the casing in spaced relation with the rim, a securing member disposed under each of the spring means, a yoke positioned in each of the spring means, and contacting with the securing member for holding the securing member into engagement with the casing.

4. In combination with a wheel rim having openings formed therein, a cushion tire including a casing, spring members positioned within the casing, each of said spring members including a supporting block, a securing member contacting with the casing, a yoke disposed over each block, and contacting with the securing member for moving the securing member into engagement with the casing, and means extending through the openings in the rim and contacting with the yokes for moving the supporting blocks away from the rim to secure the spring members within the casing.

In testimony that I claim the foregoing as my own I have hereto affixed my signature in the presence of two witnesses.

GEORGE MADISON GOUDY.

Witnesses:
I. E. SIMPSON,
P. A. ROCKELLI.